March 16, 1971 F. GUZZO 3,570,132
SQUARING TOOL
Filed June 11, 1969

INVENTOR
Francesco Guzzo
BY John L. Hutchinson
ATTORNEY

United States Patent Office 3,570,132
Patented Mar. 16, 1971

3,570,132
SQUARING TOOL
Francesco Guzzo, Melrose Park, Ill., assignor to John L. Hutchinson, Wheaton, Ill., a fractional part interest
Filed June 11, 1969, Ser. No. 832,377
Int. Cl. G01b 5/24
U.S. Cl. 33—174          2 Claims

ABSTRACT OF THE DISCLOSURE

The present invention is directed to a tool for determining, within limits, whether one surface is at right angles to another surface. The tool consists of a circular wheel-like base and a coaxial cylindrical shaft fixed perpendicular to the base. Attached to the shaft is a sensitizer or pickup arm adapted to contact a surface at right angles to the surface supporting the base. Associated with the sensitizer arm is an indicator whose reading is controlled by the movement of the sensitizer arm. Also provided is a second circular wheel-like element adapted to be removably attached to the free end of the shaft, which, together with the wheel-like base, is used to zero the sensitizing arm when the tool is placed on its side with the two wheels resting on the same flat surface.

---

In the field of metal machining and cutting it is frequently necessary to form an article wherein one surface must be substantially at right angles to another surface, or having two surfaces "squared." In many instances it may be essential that the angular relationship between two such surfaces of a part be held to within several thousandths of an inch. Accordingly, reasonably accurate means of determining the "squareness" of surfaces is required.

At present, large bulky "standard" surface blocks are frequently used which are moved adjacent to a surface undergoing machining or grinding. Thin paper is then inserted between the surface being machined and the juxtaposed standard surface and passed up and down between the opposing surfaces to determine the degree of squareness of the machined surface.

A standard surface block of the above described type is generally heavy and bulky and, accordingly, has limited mobility.

It is an object of the present invention to provide a new tool for determining the "squareness" of two surfaces.

Another object is to provide a tool of the foregoing type which is easily moved from one location to another and which may be readily manufactured and assembled.

In the drawing FIG. 1 is an elevation illustrating the tool in the present invention in position for zeroing the sensitizing arm.

Figure 1:
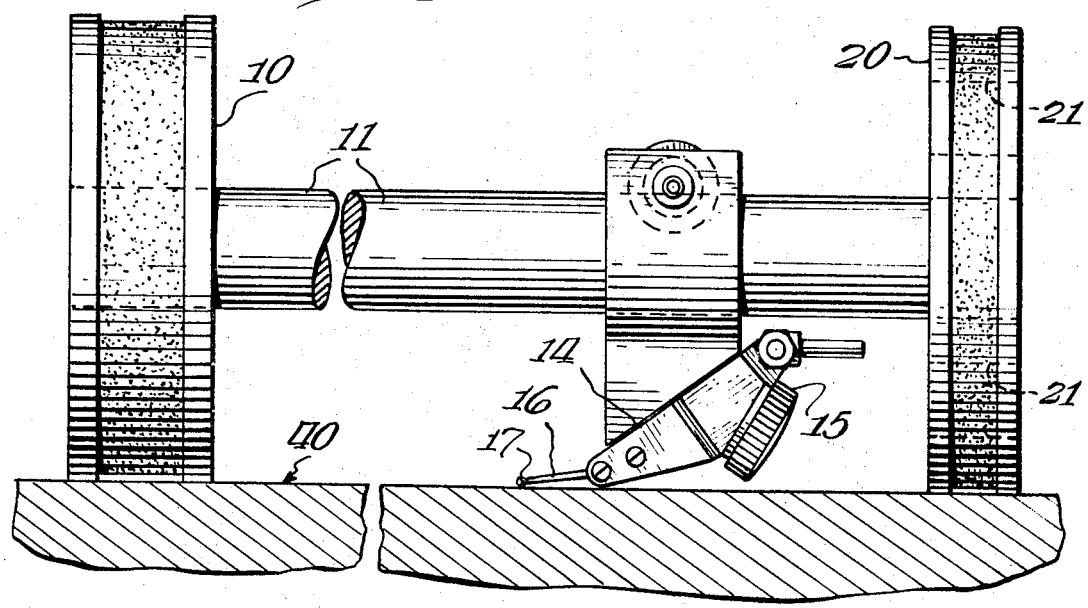
Figure 2:
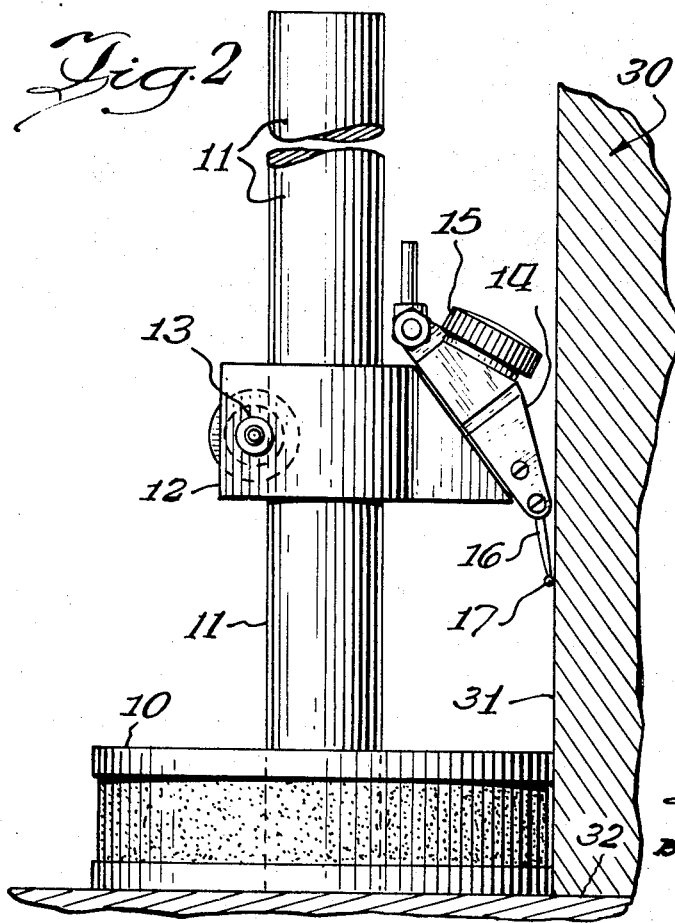
FIG. 2 is an elevation demonstrating the use of the tool contemplated by this invention in measuring the squareness of a surface.
Figure 3:
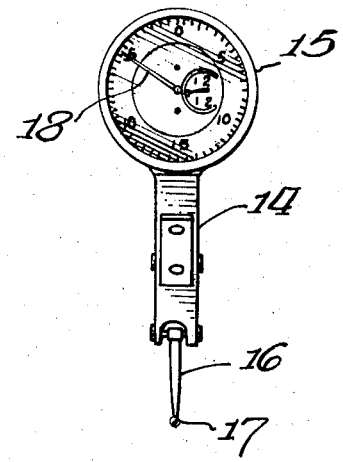
FIG. 3 is a front view of the sensitizing arm and associated indicator.

Turning now to the drawing, the numeral 10 indicates a circular wheel-like base having a perpendicular coaxial cylindrical shaft 11 secured thereto. Attached to the shaft is a bracket 12 adapted to be moved up or down on the shaft 11 and held thereon at any predetermined position by locking means 13, which, preferably, is a threaded element extending transversely through opposing ends, not shown, of the bracket 12 surrounding shaft 11.

Carried by bracket 12 is a support 14 for an indicator 15 to measure movement of sensitizing or pickup arm 16. Arm 16 is generally provided with an enlarged spherical end 17 for contact with a desired surface to be gaged. Indicator 15 is provided with a dial and associated measuring arm 18 which is connected by a suitable linkage to arm 16.

Adapted to be removably attached to shaft 11 is a second wheel-like element 20 having a diameter equal to that of circular base 10. A plurality of transverse openings 21 are preferably provided in the body of element 20.

As indicated, the tool of this invention is intended for use in determining or gaging the squareness of a surface undergoing a machining such as surface 31 of a part 30. Generally, the squareness of surface 31 will be determined in relationship to a surface at right angles to surface 31, such as surface 32.

Prior to testing a surface for its squareness, sensitizing arm 16 must be adjusted to a zero position. In this connection, arm 16 may be attached to support 14 by a friction grip or other suitable means which will permit its lateral adjustment, relative to shaft 11, to any desired initial position without otherwise affecting its operating linkage with arm 18 of indicator 15. Such a mechanism is commercially available and forms no part of the present invention per se.

In order to adjust arm 16 to a zero position, wheel element 20 is attached to the top of shaft 11, as shown in FIG. 1. Also, as illustrated in FIG. 1, after installation of the element 20 the tool is then placed on its side so that wheels 10 and 20 are resting on a standard plane surface 40. As both of the wheels 10 and 20 have the same diameter, shaft 11 will be parallel to surface 40.

While the tool is in the position shown in FIG. 1, sensitizing arm 16 will be adjusted until spherical end 17 rests lightly on surface 40 with arm 18 of the dial of indicator 15 reading at zero as a base point. When so adjusted, arm 16 may then be "backed off" either forward or backward to allow for a permissible tolerance as may be required.

The openings 21 in element 20 will permit viewing the dial of indicator 15 when element 20 is attached to shaft 11.

After zeroing arm 16, wheel element 20 is removed and the tool may then be placed against a surface 31 while supported by surface 32. The periphery of wheel base 10 will abut the lower portion of surface 31. In the event surface is out of square sensitizer arm 16 will be accordingly activated and its movement reflected in the movement of arm 18 on the dial of indicator 15.

Sensitizer arm 16 may be positioned at any location on shaft 11 by movement of bracket 12. However, it is generally not necessary to gage surface 31 at numerous points. Rather, measurement at one point is customarily sufficient to determine whether a particular surface is overall within tolerance.

As can be appreciated, the size and shape of the tool can be varied; however, its construction is such that it is readily portable and can be easily moved from one location to another.

What is claimed is:

1. A tool for use in determining the squareness of two surfaces at substantially right angles with respect to each other comprising in combination a circular base, a vertically extending cylindrical shaft attached to said base and disposed perpendicular thereto, a pickup arm connected to an indicator attached to said shaft and movable vertically thereon, means for locking said pickup arm and indicator at a predetermined height on said shaft, and a circular top having the same diameter as said circular base and adapted to be removably attached to the free end of said shaft.

2. A tool as described in claim 1 wherein said circular top is provided with at least one opening extending transversely through the body thereof.

References Cited

UNITED STATES PATENTS

| | | | |
|---|---|---|---|
| 3,087,247 | 4/1963 | Busch | 33—1(BB) |
| 3,387,374 | 6/1968 | Gordon | 33—172(B)UX |

LEONARD FORMAN, Primary Examiner

P. G. FOLDES, Assistant Examiner

U.S. Cl. X.R.

33—172B, 174Q